(No Model.)
G. P. KIMBALL.
TWO WHEELED VEHICLE.
No. 272,557. Patented Feb. 20, 1883.
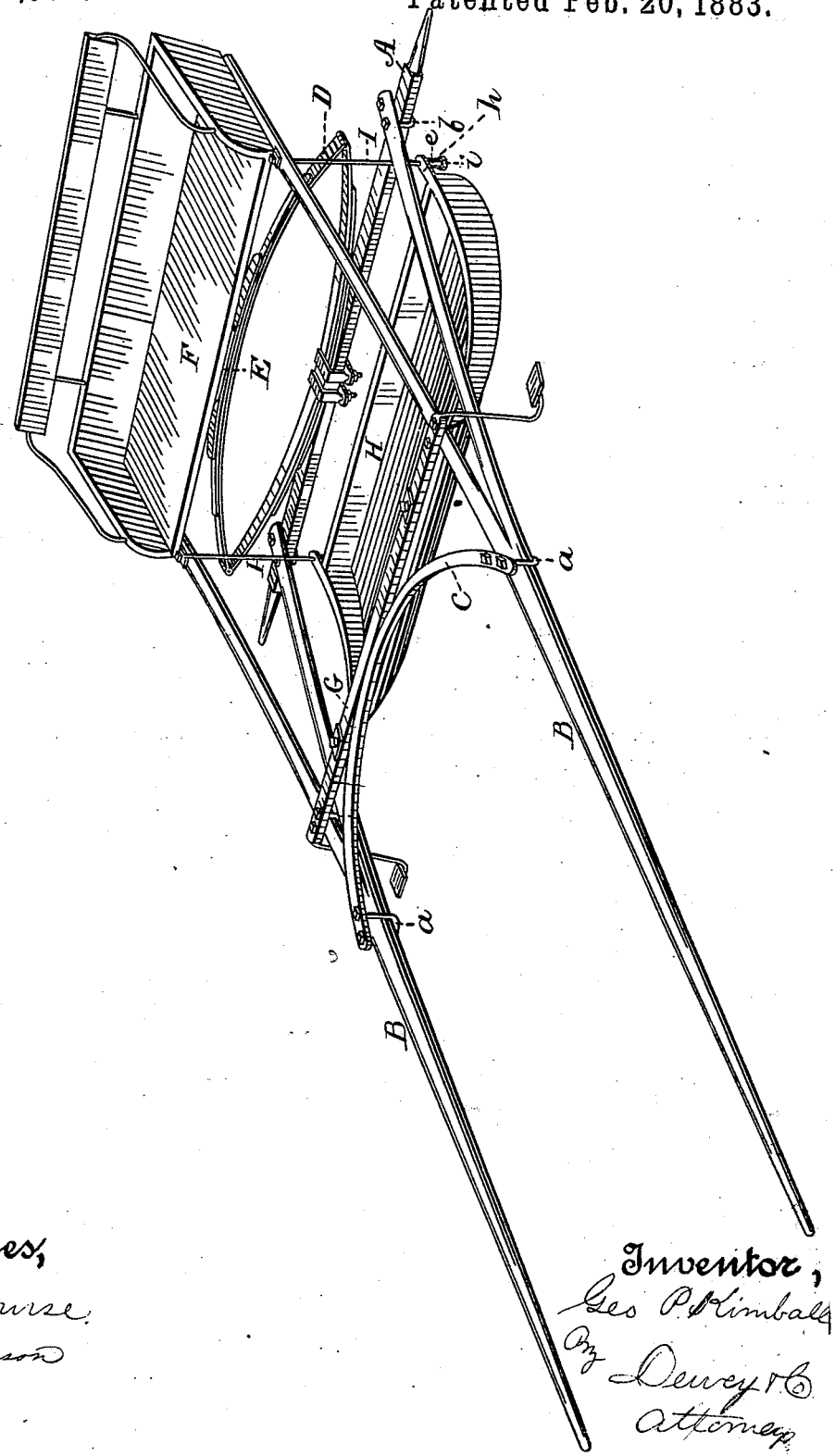
Witnesses,
D. H. Srouse
G. W. Emerson
Inventor,
Geo. P. Kimball
By Dewey & Co
Attorney

UNITED STATES PATENT OFFICE.

GEORGE P. KIMBALL, OF SAN FRANCISCO, CALIFORNIA.

TWO-WHEELED VEHICLE.

SPECIFICATION forming part of Letters Patent No. 272,557, dated February 20, 1883.

Application filed July 20, 1882. (No model.)

*To all whom it may concern:*

Be it known that I, GEORGE P. KIMBALL, of the city and county of San Francisco, and State of California, have invented an Improved Two-Wheeled Vehicle; and I do hereby declare the following to be a full, clear, and exact description thereof.

My invention relates to the class of two-wheeled vehicles; and it consists in a novel construction of the shafts and in their relation to the axle and body.

It consists, also, in a novel arrangement of springs and the foot-board in relation to the shafts, axle, and body, all of which will hereinafter fully appear.

The object of my invention is to provide an easy-riding vehicle, which, on account of the construction and arrangement of its parts, will be both economical and effective.

Referring to the accompanying drawing, the figure is a perspective view of my vehicle.

Let A represent the axle of the vehicle.

B B are the shafts. These are made, as usual, of wood. Their rear ends are longitudinally divided or split to a point forward of the limit of the foot-board. At this point is clipped a curved brace, C. The clips a, by which this brace is secured, embrace the shafts and pass up through the brace, receiving nuts above. These clips thus prevent the further splitting of the shafts. The lower half of the split end of the shaft is clipped rigidly to the axle by clips b, embracing the axle and passing up through the shafts, receiving nuts above. These do not weaken the axle, and firmly secure the shaft. The end of the shaft may stop at the axle, or may be carried beyond to any desirable distance, from which to sustain a rear board or box.

Clipped to the center of the axle, and lying parallel with it, is an ordinary elliptical spring, D, upon top of which, by the intervention of a bar or of a spring-block, E, a seat or body, F, is secured. The spring is under the front portion of the seat. The sides of the seat are secured upon the ends of the upper halves of the split shafts B B, which extend beyond the axle a sufficient distance to allow the spring D to be under the front of the seat.

G is a cross-bar secured between the upper halves of the split shafts B. It is secured also to the curved brace C.

H is the foot-rest. It has a curved floor, as usual, and is secured firmly in front to the cross-bar G. It is hung loosely at its rear end upon rods I, secured to the upper halves of the split shafts, and which pass down through extensions h of the foot-rest and receive nuts i upon their ends. Between the nuts i and the extensions h are rubber or elastic thimbles e.

The effect of the construction which I have thus described is as follows: By splitting the shafts, as shown, they form double-acting wood springs. The tendency, if both ends were free, would be to spring together, and the force of the spring may be adjusted by regulating the length of the split. The lower half of the divided shaft, being secured to the axle, cannot rise to meet the other half, but in the tendency so to do it transfers its force, or a portion thereof, to the upper half, to which is thus given an augmented spring, which gives a very desirable effect. Now, by properly bending and seasoning the split portion the lower may be bent down to the axle and the upper bent upward to the seat, so that, even without the intervention of a secondary spring—such as D—the seat might be made to support a weight without being borne down to the axle, and thus would have a gentle spring; but to perfect the device I interpose the spring D, which modifies the spring of the shafts, strengthening them and adding to their effect and providing a very easy motion, at the same time affording strength to carry any suitable weight for the purpose of the vehicle. It does not detract from effect of the spring-shafts, for these latter do not touch it, but pass clear of it on each side, so that the seat may have the advantage of the long wood spring, and at the same time be strengthened and more completely supported by the elliptical spring.

The object to be gained in the construction of two-wheeled vehicles is to overcome the jogging motion of the horse. This can only be done by giving to the seat a certain independence of motion, whereby the rider may counteract the motion derived from the horse. It will be seen that by the construction here shown this is accomplished. If the shafts were rigid and connected directly with the seat, when the forward ends rose the rear ends, with the seat, would be depressed; but in the present construction the effect of a spring is interposed, and the rider's weight upon the rear ends of the shafts (themselves a spring) may counteract any motion at the forward ends. By connecting the foot board or rest with the upper half of the split shafts it will have the same motion as the seat, and thus will have the same effect as if the two formed but one body. In addition to this, the foot-rest, by being hung loosely upon rods I and having a cushion in the thimbles e, may have a certain independent or further motion to take off jars.

I am aware that wood springs are not new. I also know that in a two-wheeled vehicle strips of wood have been secured to the shafts, fulcrumed on a cross-bar, and have supported the seat upon their rear ends; but the effect of this construction is not the same as I have shown, because the effect of the lower half of the shaft is entirely wanting.

Having thus described my invention, what I claim as new, and desire to secure by Letters Patent, is—

1. In a two-wheeled vehicle, the shafts B B, having their rear ends split or longitudinally divided, and their divided portions separated vertically, the lower portion being secured to the axle and the upper portion supporting the seat or body, substantially as and for the purpose herein described.

2. In a two-wheeled vehicle, the axle A and seat or body F, in combination with the shafts B B, having their rear ends split or longitudinally divided, the lower portion being clipped to the axle and the upper supporting the seat, substantially as herein described.

3. In a two-wheeled vehicle, the combination of the axle A, seat F, shafts B B, having their rear ends split or longitudinally divided, one portion being clipped to the axle and the other supporting the seat, and the spring D, clipped to the axle and bolted to the seat, substantially as and for the purpose herein described.

4. In a two-wheeled vehicle, the axle A and shafts B B, having their rear ends split or longitudinally divided, the lower half of said ends being clipped to the axle, in combination with the seat F, supported upon the upper half of the split ends of said shafts, and the foot-rest H, supported by and hung from said upper half of the shafts, substantially as and for the purpose herein described.

5. In a two-wheeled vehicle, the axle A, shafts B B, having split or longitudinally-divided rear ends, and a cross-bar, G, and the spring D, in combination with the seat F, and the foot-rest H. secured in front to the cross-bar G, and hung behind on rods I, attached to the upper half of split ends of the shafts, and passing loosely down through said foot-rest, and carrying an elastic cushion, e, and nut i underneath, arranged as shown, substantially as and for the purpose herein described.

6. The shafts B B, having split or longitudinally-divided rear ends, secured to the axle and supporting the seat, as shown, in combination with the brace C, clipped at each end to the shafts by clips a, embracing the shafts at the junction of their divided ends, substantially as and for the purpose herein described.

In witness whereof I hereunto set my hand.

GEORGE P. KIMBALL.

Witnesses:
C. D. COLE,
J. H. BLOOD.